United States Patent [19]
Anderson

[11] Patent Number: 6,065,729
[45] Date of Patent: May 23, 2000

[54] SLIDE-OUT CONTAINER HOLDER

[75] Inventor: Rick A. Anderson, Grand Haven, Mich.

[73] Assignee: Prince Corporation, Holland, Mich.

[21] Appl. No.: 09/014,819

[22] Filed: Jan. 28, 1998

[51] Int. Cl.$^7$ ............................. A47K 1/08; B60R 7/00; A47C 7/62
[52] U.S. Cl. .................. 248/311.2; 224/926; 224/282; 297/188.15
[58] Field of Search ................ 248/311.2, 310; 297/188.16, 188.07, 188.19, 188.14, 188.15, 188.17, 188.18; 224/281, 926, 539, 275, 280, 42.42, 273, 296, 282, 279, 483, 553, 554, 42.45 R

[56] References Cited

U.S. PATENT DOCUMENTS

| | | |
|---|---|---|
| 4,583,707 | 4/1986 | Anderson ............................. 248/311.2 |
| 5,018,633 | 5/1991 | Toth et al. . |
| 5,190,259 | 3/1993 | Okazaki . |
| 5,259,580 | 11/1993 | Anderson et al. ................... 248/311.2 |
| 5,297,709 | 3/1994 | Dykstra et al. . |
| 5,318,343 | 6/1994 | Spykermann et al. .................. 297/194 |
| 5,460,309 | 10/1995 | Nehl et al. .............................. 224/281 |
| 5,520,313 | 5/1996 | Toshihide ............................. 248/311.2 |
| 5,628,486 | 5/1997 | Rossman et al. ..................... 248/311.2 |
| 5,718,405 | 2/1998 | Adachi ................................. 248/311.2 |
| 5,845,888 | 12/1998 | Anderson ............................. 248/311.2 |
| 5,863,633 | 1/1999 | Pelchat, II et al. .................. 248/311.2 |
| 5,890,692 | 4/1999 | Lee et al. ............................. 248/311.2 |

Primary Examiner—Anita M. King
Assistant Examiner—Michael Nornberg
Attorney, Agent, or Firm—Harness, Dickey & Pierce, P.L.C.

[57] ABSTRACT

A tray-like container holder is slideably and pivotally coupled to one end of a pivot arm such that the container holder can both slide and pivot from a vertically stored position to a use position. The end of the pivot arm remote from the container holder includes an over-center spring which assists in moving and holding the container holder between a generally horizontal use position and a compactly stored vertical position.

17 Claims, 3 Drawing Sheets

SLIDE-OUT CONTAINER HOLDER

BACKGROUND OF THE INVENTION

The present invention relates to a container holder and particularly one which pivots outwardly from a vertically stored position to a use position.

There exists a variety of container holders which add to the convenience of vehicle use, allowing drivers and passengers to enjoy beverages while traveling to and from various locations. Frequently such container holders are mounted in consoles positioned between the seats of the vehicle. U.S. Pat. No. 5,018,633 discloses one such dual container holder assembly which is shaped to drop into a storage bin of a console. The container holder disclosed therein provides a pair of container holders in side-by-side relationship, requiring a somewhat wider console than available in many model vehicles. Other compact, push-up container holders are known as, for example, disclosed in U.S. patent application Ser. No. 08/895,731, filed Jul. 17, 1997, and entitled RETRACTABLE CONTAINER HOLDER, which discloses a vertically stored parallel arm single cupholder which extends from a relatively compact space for mounting, for example, in a vehicle door panel.

There remains a need for a relatively narrow compact cupholder assembly which can provide a dual cupholder in longitudinal relationship in a narrow vehicle console for relatively compact vehicles. Further, there remains a need for a container holder which easily moves from one position to another without requiring significant manual effort or attention which could be distracting to a driver during vehicle operation.

SUMMARY OF THE PRESENT INVENTION

The system of the present invention provides such a container holder assembly by providing a pivot arm which couples to a container holder slide assembly which is pivotally coupled to one end of the arm such that the container holder can both slide and pivot from a vertically stored position to a use position. In a preferred embodiment of the invention, the end of the pivot arm remote from the container holder slide assembly is coupled to an over-center spring which assists in locking the container holder into a use position and holding it in a stored position.

These and other features, objects and advantages of the present invention will become apparent upon reading the following description thereof together with reference to the accompanying drawings.

DETAILED DESCRIPTION OF THE PREFERRED EMBODIMENT

Figure 1:
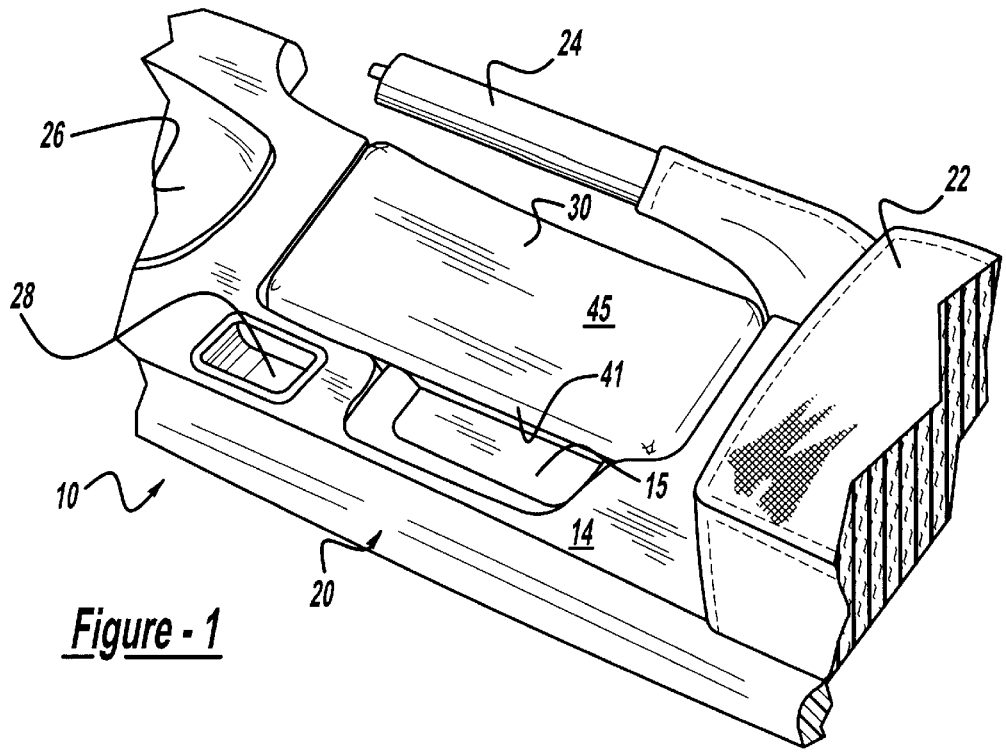
FIG. 1 is a top perspective view of a container holder of the present invention, shown in a stored position.
Figure 2:
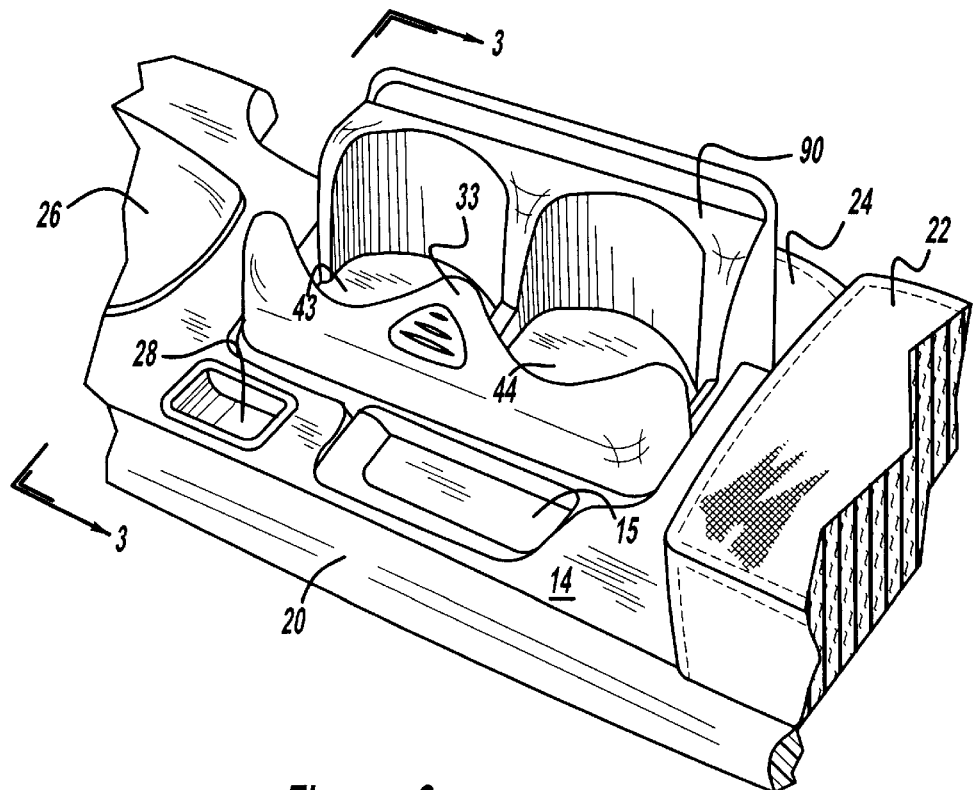
FIG. 2 is a top perspective view of the container holder shown in FIG. 1, shown in an extended use position.

Referring initially to FIGS. 1 and 2, there is shown a vehicle 10, such as an automobile, which includes a center console 20 extending between the driver and front passenger seats. The console 20 may integrally include an armrest 22, a parking brake assembly lever 24, an ashtray 26 and control switches 28 for controlling electrically operated vehicle accessories. Integrally mounted to the center area of the console forwardly of the armrest 22 is a container holder assembly 30 of the present invention.

Figure 5:
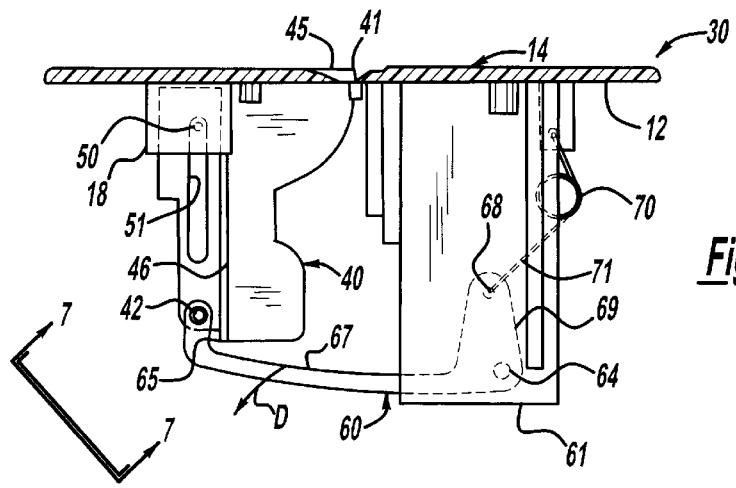
FIG. 5 is a front elevational view of the container holder shown in FIGS. 1–4, shown with the container holder in the stored position, as also seen in FIG. 1.

The container holder 30 includes a generally tray-shaped support 40 which is slideably and captively mounted to a fixed cross arm 50 (FIGS. 6 and 7), which extends in spaced relationship to a lower surface 12 of the top horizontally extending wall 14 of console 20 by means of a pair of spaced mounting bosses 16, 18. The tray-like container holder 40 is additionally pivotally mounted by a pivot rod 42 at one end of the tray-like container holder 40 to a pair of generally U-shaped pivot arms 60, 62 which, in turn, are pivotally mounted at their opposite end to a pivot rod 64 extending between mounting bosses 61, 63, respectively. Bosses 61, 63 also extend downwardly in spaced relationship from the lower surface 12 of console wall 14. Arms 60 and 62 each include a first upwardly extending leg 65, a central elongated leg 67 and a second leg 69 remote from leg 65. The ends of each of legs 69 are coupled to an over-center spring 70 by means of an aperture 68 in each of the legs 69. The over-center spring 70 has a first end 71 coupled in aperture 68 and a second end 72 coupled in aperture 73 of a mounting boss 74 also extending downwardly from surface 12 of wall 14 of console 20. The spring 70, thus, provides a compressive bias force tending (in FIG. 3) to rotate the pivot arms 60, 62 in a clockwise direction, holding the container holder in its use position and, when in a retracted position as shown in FIG. 5 and described in greater detail below, again provides a force on the other side of pivot axle 64 tending to rotate arms 60, 62 in a counterclockwise direction holding the container holder in a stored position under the influence of the pair of bias springs 70. Having described the overall construction of the container holder assembly, a more detailed description of the tray-like container holder 40 and its mounting to pivot arms 60, 62 is now described.

The container holder 40 is, as noted above, a tray-like member having an upper surface 90 (FIG. 2) with a pair of generally cylindrical depressions 43, 44 which are longitudinally aligned along the longitudinal center line of console 20, as best seen in FIG. 2, to provide cup holding recesses. The top wall 14 of the console includes a depression 15 which allows the driver or passenger to engage an edge 41 of container holder tray 40, which edge defines the top lip of the container holder when in its use position, as seen in FIG. 2, and which is joined to the decorative panel 45 of the container holding tray 40. This provides the decorative cover, as seen in FIG. 1, when the container holder is in its closed position. The tray-like container holder 40 also includes a floor 46, end walls and the upper surface 90 which defines the recesses 43, 44.

Figure 3:
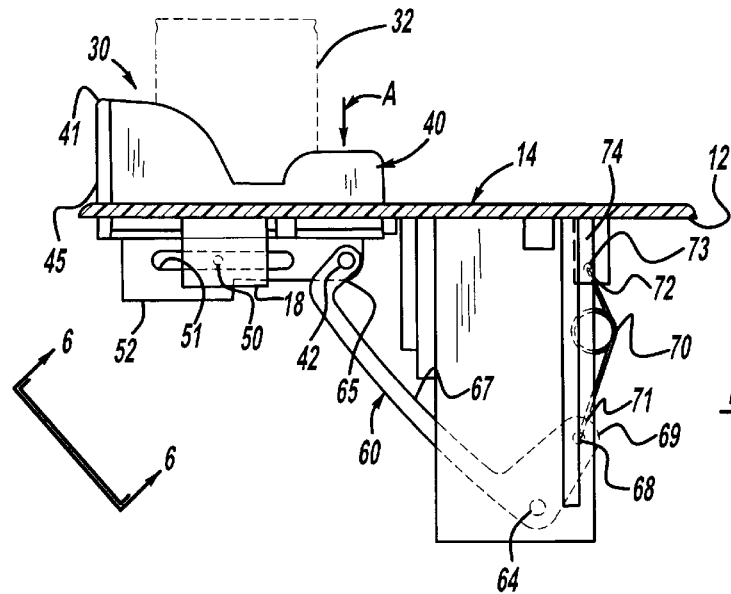
FIG. 3 is a front elevational view of the container holder in the use position shown in FIG. 2, taken in the direction indicated by arrows III—III in FIG. 2.
Figure 6:
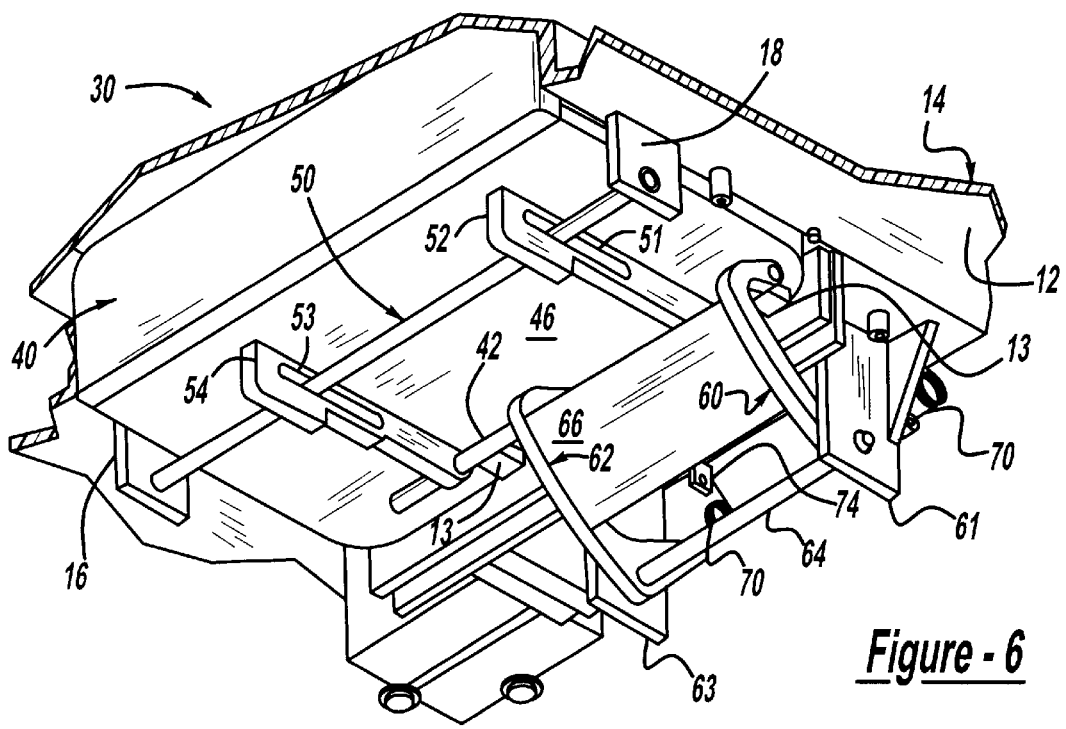
FIG. 6 is a bottom perspective view of the container holder in the use position as viewed generally in the direction of arrow VI—VI of FIG. 3.
Figure 7:
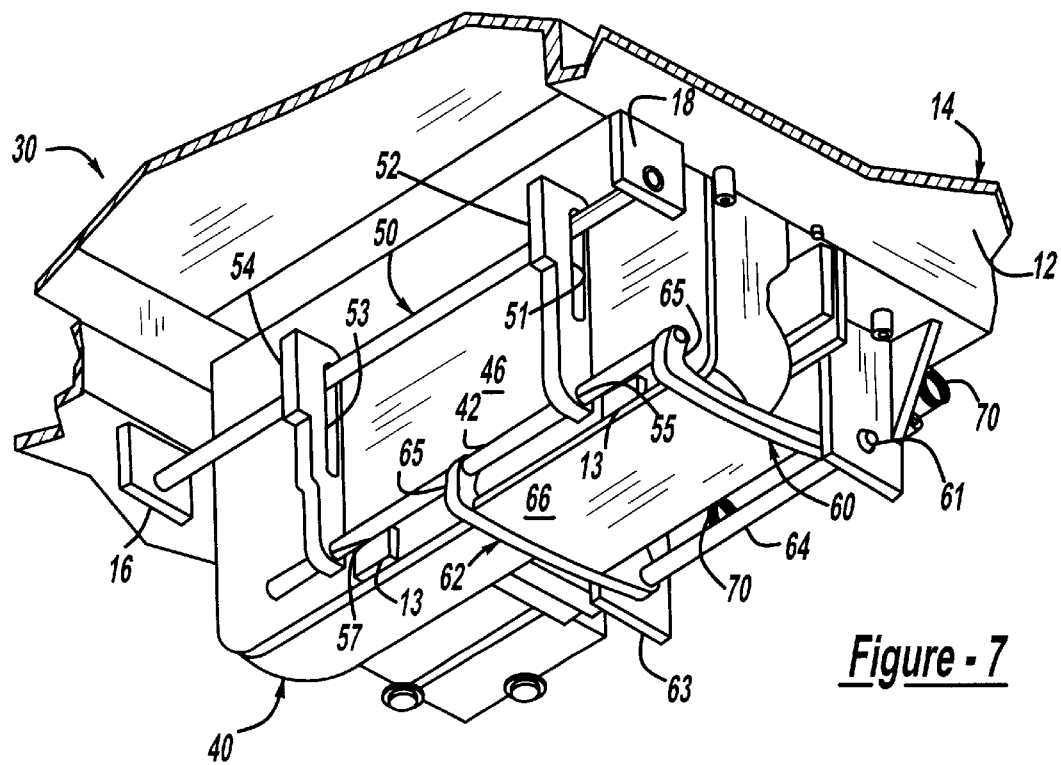
FIG. 7 is a bottom perspective view of the container holder, shown in the stored position, as viewed in the direction of arrow VII—VII of FIG. 5.

Mounted to the underside of floor 46, as best seen in FIGS. 6 and 7, are a pair of parallel spaced-apart guide members 52 and 54, which extend downwardly and outwardly from floor 46 and include elongated slots 51 and 53, respectively, which captively receive guide rod 50 therein for controlling the sliding motion of the container holder tray 40 as it moves from its use position, as seen in FIGS. 3 and 6, to its stored position, as shown in FIGS. 5 and 7. Each of the spaced guides 52, 54 further include an aperture 55, 57, respectively, near their end remote from wall 45 for pivotally or rotatably receiving pivot rod 42, which is fixed at opposite ends to ends of legs 65 of pivot arms 60, 62. Rod 42 extends, as best seen in FIGS. 6 and 7, in rotatable relationship to apertures 55, 57 in guides 52, 54 with pivot arm 62 intermediate guides 52, 54. Pivot arms 60, 62 are coupled to one another for stabilizing by a flat platform 66 extending therebetween, as best seen in FIGS. 6 and 7.

Figure 4:
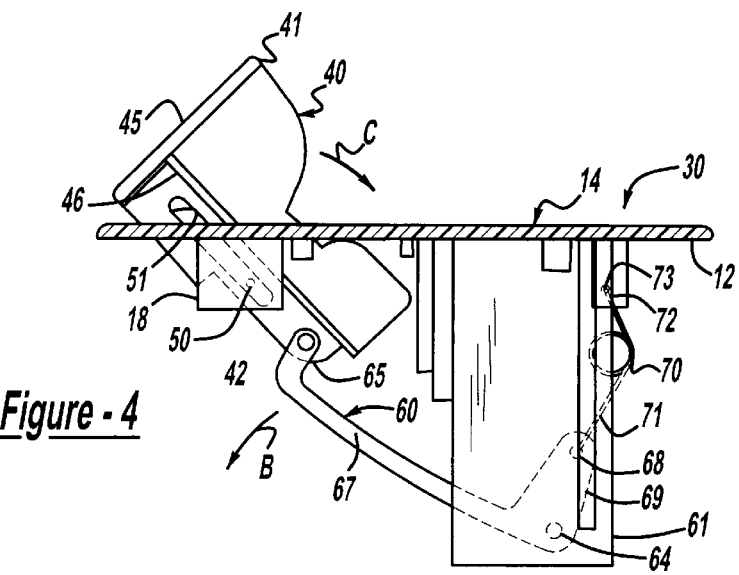
FIG. 4 is a front elevational view of the container holder shown in FIGS. 1–3, shown in a partially retracted position.

The operation of the container holder assembly is best seen in viewing FIGS. 3–5 together with the bottom perspective views of FIGS. 6 and 7. Starting with the container holder in a raised position, as seen in FIGS. 2, 3 and 6, compression spring 70 urges pivot arms 60, 62 in a clockwise position which provides an upward force to the container holder, holding it in a horizontal position, stabilized by the cross arm 50 which extends through guides 52, 54. Pivot rod 42 rests against stops 13 (FIG. 6) and arms 60 and 62 also stabilize the end of the tray-like slide platform 40 such that containers such as a soda can 32 can be positioned within the recesses 43 and 44 of the container holder assembly 30. When it is desired to retract the container holder from the position shown in FIG. 2 to a stored position, as shown in FIGS. 1, 5 and 7, a downward force in the direction indicated by arrow A (FIG. 3) is applied in the center area 33 (FIG. 2) between cupholders 43 and 44. This force pivots arms 60, 62 in a counterclockwise direction opposing the compressive forces of coil springs 70, causing the arm 60 to rotate in a counterclockwise direction, as indicated by arrow B in FIG. 4, while the tray-like container holder 40 rotates downwardly, as indicated by arrow C in FIG. 4. As this occurs, the guides 52, 54 slide along transversely extending cross arm 50 initially forwardly as arms 60, 62 tend to urge the tray-like platform 40 away from pivot point 64 and subsequently in the opposite direction (downwardly as seen in FIG. 5) as the pivot arms 60, 62 are substantially horizontal. Springs 70 now urge pivot arms 60, 62 downwardly in a direction indicated by arrow D in FIG. 5, thereby holding the container holder in its stored retracted position with the finished surface 45 exposed at the top of console 20 as seen in FIG. 1.

By providing the sliding tray 40 and double pivoting action of arms 60, 62 with cross arm 50 extending in slots 51 and 53 of guides 52 and 54 coupled to the bottom of tray-like sliding container 40, the container holder moves compactly, horizontally and vertically, while rotating, as seen in FIGS. 3–5 between a horizontally extending use position and a vertically extending stored position. Thus, a relatively compact, easily operated container holder is provided which is assisted by over-center bias springs and is easily moved from a stored position in which the springs act to hold the container holder in the stored position and a raised use position in which the springs act on the opposite side of the pivot point 64 to hold the container holder in the raised use position. The springs are selected to provide sufficient force to maintain the container holder in a use position for all normal containers, and it is necessary to press in the area 33 (FIG. 2) as indicated by arrow A in FIG. 3 on a side of pivot rod 42 opposite end wall 45 of the container holder to easily pivot the container holder down until the over-center spring 70 snaps the container holder into a lowered stored position. Preferably, holder 40 is integrally formed with guides 52, 54 of a suitable polymeric material, such as polycarbonate. The console defining the housing for the container is also preferably integrally formed of a suitable polymeric material to include mounting bosses 16, 18, 61 and 63. The pivot arms 60, 62 and platform 66 can also be integrally molded of a suitable polymeric material. The pivot rods, cross arm and springs can be made of a metal such as steel suitably treated for the automotive environment.

In some embodiments of the invention, a single pivot arm and guide can be employed, however, these and other modifications to the preferred embodiment of the invention as described herein can be made by those skilled in the art without departing from the spirit or scope of the invention as defined by the appended claims.

The invention claimed is:

1. An assembly comprising:

a vehicle console defined by a housing having an opening formed therein for receiving a container holder;

a container holder having a floor with a recess therein for receiving a container, said floor including a guide extending from a side opposite said recess, said guide including an elongated slot, a bar extending through said slot and having an end, said end, of said bar being fixedly mounted to said housing;

at least one pivot arm having one end pivotally coupled to said floor of said container holder, said pivot arm pivotally mounted to said housing; and, an over-center spring coupled to said housing and to said pivot arm at an end opposite said coupling to said floor thereby pivoting said pivot arm, wherein said over-center spring acts upon said container holder to bias said container holder to a use position, and to bias said container holder to a stored position.

2. The assembly as defined in claim 1, wherein said at least one pivot arm includes two spaced-apart pivot arms, each of said pivot arms having one end pivotally coupled to said floor of said container holder.

3. The assembly holder as defined in claim 2 including a platform extending between said pivot arms.

4. The assembly as defined in claim 3 further comprising at least two of said over-center springs, each of said springs being coupled to an end of each of said pivot arms.

5. The assembly holder as defined in claim 4 wherein each of said springs comprise a coil spring coupled to an end of each of said pivot arms remote from said floor.

6. The assembly holder as defined in claim 1 wherein said guide comprises a pair of spaced-apart guide arms, each having an elongated guide slot for receiving said bar.

7. The assembly holder as defined in claim 6 wherein said pivot arms are pivotally mounted to said guide arms.

8. The assembly as defined in claim 7 wherein said pivot arm includes a central leg and end legs extending orthogonally from opposite ends of said central leg.

9. The assembly as defined in claim 8 wherein said container holder is made of a polymeric material.

10. A container holder comprising:

a housing for mounting to a vehicle, said housing defining an opening for receiving a container holder support therein;

a container holder support having a floor with a recess therein for receiving a container, said floor including a pair of parallel spaced-apart guides extending from a side of said floor opposite said container holding recess, said guides including slots formed therein for receiving a guide bar, said guide bar extending between said guides, and being fixedly mounted to said housing;

at least one pivot arm having a first end pivotally coupled to said floor and an opposite end pivotally mounted to said housing, said pivot arm having an extension from said opposite end for coupling to an over-center spring; and an over-center spring extending between said housing and said extension of said pivot arm, wherein said over-center spring acts upon said container holder support thereby urging said container holder support toward a use position and toward a stored position.

11. The container holder as defined in claim 10, wherein said at least one pivot arm includes two spaced-apart pivot arms, each of said pivot arms having one end pivotally coupled to said floor of said container holder.

12. The container holder as defined in claim 11 including a platform extending between said pivot arms.

13. The container holder as defined in claim 12 wherein said pivot arms are pivotally mounted to said guide arms.

14. A vehicle console comprising:

a housing for mounting to a vehicle, said housing including a top having an opening for storably receiving a container holder;

a container holder having a floor with a recess therein for receiving a container, said floor including guide means on a side of said floor opposite said recess, said guide means including a pair of parallel spaced-apart members each having an elongated slot formed therein and a bar extending through said slots and fixedly mounted to said housing;

at least one pivot arm having one end pivotally coupled to said floor and an opposite end pivotally coupled to said housing; and an over-center spring extending between said housing and said pivot arm, and acting upon said container holder thereby urging said container holder toward a use position extended from said housing and urging said container holder toward a stored position within said housing.

15. The vehicle console as defined in claim 14 wherein said guide means slideably couples said floor to said housing.

16. A container holder comprising:

a housing for mounting to a vehicle, said housing including a top having an opening formed therein;

a tray-shaped member having a floor with a recess therein for receiving a container, said floor including guide means on a side of said floor opposite said recess, said guide means including a pair of parallel spaced-apart members, each having an elongated slot formed therein;

a guide bar extending between said guide means and said housing to allow said tray-shaped member to slide with respect to said housing, said guide bar extending through said slots;

at least one pivot arm having one end pivotally coupled to said floor and an opposite end pivotally coupled to said housing; and an over-center spring extending between said housing and said pivot arm, said over-center spring acting upon said container holder thereby selectively urging said container holder toward a use position extended from said housing and toward a stored position within said housing.

17. The container holder as defined in claim 16 wherein said over-center spring comprises a coil spring.

* * * * *

UNITED STATES PATENT AND TRADEMARK OFFICE
CERTIFICATE OF CORRECTION

| | | |
|---|---|---|
| PATENT NO. | : 6,065,729 | |
| DATED | : May 23, 2000 | |
| INVENTOR(S) | : Rick A. Anderson | |

It is certified that error appears in the above-identified patent and that said Letters Patent is hereby corrected as shown below:

This certificate supersedes Certificate of Correction issued August 20, 2002, the number was erroneously mentioned and should be vacated since no Certificate of Correction was granted.

Signed and Sealed this

Ninth Day of December, 2003

JAMES E. ROGAN
*Director of the United States Patent and Trademark Office*